United States Patent [19]

Sasuta

[11] Patent Number: 5,313,655
[45] Date of Patent: May 17, 1994

[54] METHOD FOR REDUCING CONTROL CHANNEL ACTIVITY FOR LIMITED AUDIENCE COMMUNICATIONS

[75] Inventor: Michael D. Sasuta, Mundelein, Ill.

[73] Assignee: Motorola, Inc., Schaumburg, Ill.

[21] Appl. No.: 828,324

[22] Filed: Jan. 30, 1992

[51] Int. Cl.$^5$ .............................................. H04B 7/26
[52] U.S. Cl. .................................. 455/34.1; 455/54.2
[58] Field of Search ................... 455/34.1, 34.2, 54.1, 455/54.2, 53.1, 56.1; 379/63

[56] References Cited

U.S. PATENT DOCUMENTS 4,716,407 12/1987 Borras et al. ...................... 455/54.2
5,125,102 6/1992 Childress et al. .................. 455/54.1

FOREIGN PATENT DOCUMENTS 2-81532 3/1990 Japan ................................ 455/54.2

*Primary Examiner*—Reinhard J. Eisenzopf
*Assistant Examiner*—Chi Pham
*Attorney, Agent, or Firm*—Timothy W. Markison

[57] ABSTRACT

A communication resource allocator can reduce control channel traffic for limited audience communications in the following manner. After receiving and granting a request for allocation of a communication resource by a communication unit, the communication resource allocator determines whether the request is for a limited audience communication. If the request is for a limited audience communication, the communication resource allocator periodically transmits the communication resource allocation until it receives an acknowledgement from each of the communication units in the limited audience communication.

5 Claims, 2 Drawing Sheets

METHOD FOR REDUCING CONTROL CHANNEL ACTIVITY FOR LIMITED AUDIENCE COMMUNICATIONS

FIELD OF THE INVENTION

This invention relates generally to trunking communication systems and in particular to a method for handling limited audience communications more efficiently.

BACKGROUND OF THE INVENTION

Trunking communication systems are known to comprise a plurality of communication units, a limited number of communication resources that are transceived via a predetermined number of repeaters, or base stations, and a communication resource allocator that allocates a limited number of communication resources among the plurality of communication units. The communication resources may comprise a TDM bus, a carrier frequency, a pair of carrier frequencies, and any RF transmission means. Of the communication resources, one is selected as the control channel that transceives operational data between the communication resource allocator and the communication units. The communication units, which may be portable radios and/or mobile radios, are arranged into talk groups by commonality of use. For example, a talk group may comprise communications that are operated by a police department while another talk group comprises communication units operated by a fire department.

Trunking communication systems very efficiently process communications between a large group of communication units. This efficiency is primarily due to the relative large coverage area that one system services and the ability to assign one communication resource to the large group of communication units. Once a communication resource is allocated to the large group, the communication resource allocator periodically transmits a refresher message that indicates which communication resource is assigned to the large group. The refresher message is transmitted on the control channel such that, if any of the communication units in the large group temporarily lose which communication resource is allocated to the large group, it can simply monitor the control channel for the refresher message.

Trunking communication systems also support communications for a relative small group of communication units or even one-to-one communications. However, the system's efficiency is reduced because one communication resource is allocated to a small number of communication units. The efficiency is also reduced because the communication resource allocator continues to periodically transmit refresher messages on the control channel for the small group of communication units. Therefore, a need exists for a method that allows the communication resource allocator to reduce control channel traffic for small groups, or limited audience communications.

SUMMARY OF THE INVENTION

This need and others are substantially met by the method for more efficient handling of limited audience communications disclosed herein. In a trunked communication system that comprises a plurality of communication units, a limited number of communication resources that are transceived via a predetermined number of repeaters, and a communication resource allocator that allocates the limited number of communication resources among the communication units, wherein the communication resource allocator transmits, at periodic intervals based in control channel activity, a signal to the plurality of communication units that indicates the particular communication resource at least one communication unit is allocated, the following comprises a method to reduce control channel activity for limited audience communications. Upon receiving a request for a communication resource, the communication resource allocator allocates a communication resource to the communication unit that transmitted the request. After granting the request, the communication resource allocator determines whether the request is for a limited audience communication, wherein a limited audience communication is amongst a limited number of communication units. If the request is for a limited audience communication, the communication resource allocator periodically transmits the communication resource allocation until it receives an acknowledgement from each of the communication units in the limited audience communication.

DESCRIPTION OF A PREFERRED EMBODIMENT

Figure 1:
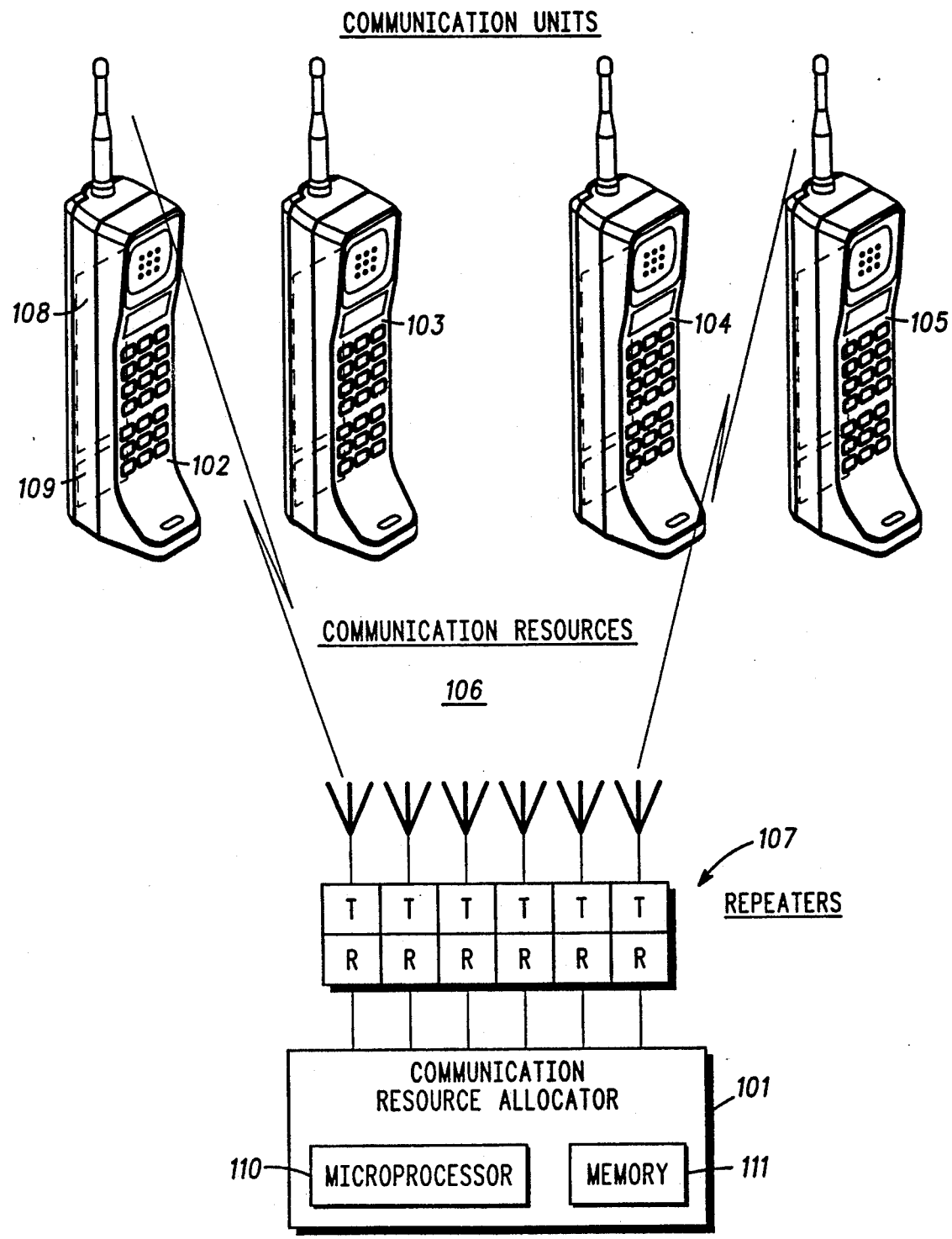
FIG. 1 illustrates a trunked communication system that may incorporate the present invention.

FIG. 1 illustrates a trunking communication system comprising a communication resource allocator 101, a plurality of communication units (four shown) 102-105, a limited number of communication resources 106, and a limited number of repeaters 107. Each of the communication units 102-105, comprise at least one microprocessor 108 and a digital storage memory device 109 which may be RAM, ROM or any other type of means for storing digital information. The communication resource allocator 101 comprises at least one microprocessor 110 and digital memory 111, wherein the digital memory may be RAM, ROM, or any other type of means for storing digital information. Each of the communication resources 106 are transceived between the communication units 102-105 and the communication resource allocator 101 via the repeaters 107, wherein the repeaters may comprise base stations. One of the communication resources 106 is selected as the control channel which transceives trunking communication system control data between the communication resource allocator and the communication units 102-105.

To establish a communication, a requesting communication unit transmits an inbound signalling word (ISW) to the communication resource allocator via the control channel. The ISW contains a request for communication, the individual identification of the requesting communication unit and the identification of the target communication unit or communication units. Once the communication resource allocator 101 processes the ISW, it will transmit an outbound signalling word (OSW), to the requesting communication unit which contains a response to the ISW. If the response is an allocation of a communication resource as a voice channel, the communication unit utilizes the allocated voice channel to carry on a communication with the targeted communication unit or units. When a communication is taking place between communication units, the communication resource allocator periodically transmits an OSW to the communication units involved in the communication to indicate which voice channel has been allocated to that communication.

Figure 2:
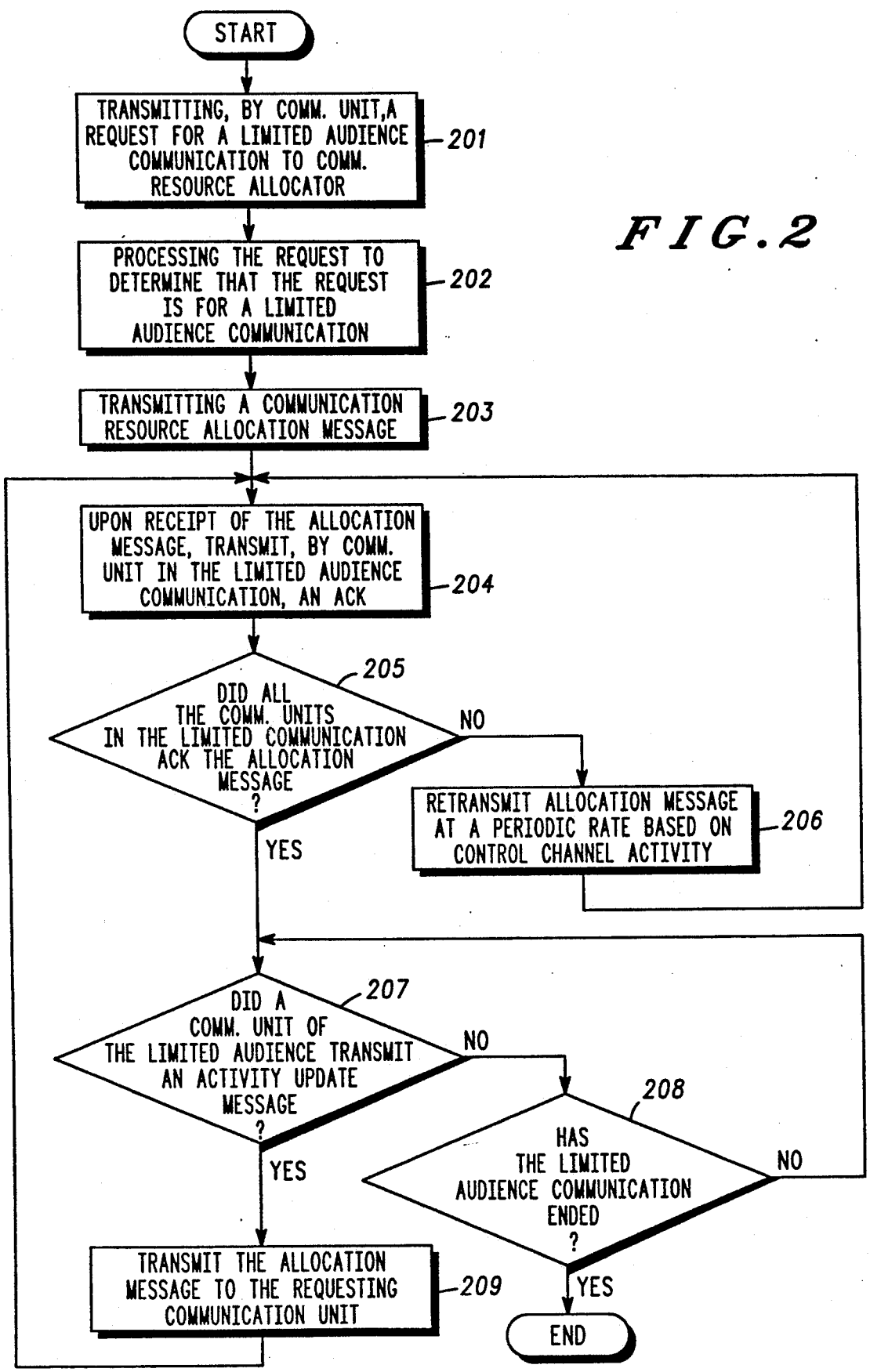
FIG. 2 illustrates a logic diagram of an implementation of the present invention.

FIG. 2 illustrates a method which allows a communication resource allocator to reduce control traffic for limited audience communications. The respective portions of the following process may be programmed in to the microprocessor of the communication resource allocator and the microprocessors of the communication units. The process begins at step 201, when a communication unit transmits an ISW that requests allocation of a communication resource for a limited audience communication. In addition, the ISW contains the requesting communication unit's individual identification code, and the identification code of the target communication unit or units (other members of the limited audience communication). After receiving the request, the communication resource allocator processes it to determine whether the request is for a limited audience communication 202. The communication resource allocator determines that the request is for a limited audience by the counting the number of target communication units, wherein up to four target units constitutes a limited audience.

Having processed the request, the communication resource allocator transmits an OSW to the communication units 203. As discussed above, the OSW may comprise an allocation of a communication resource or a rejection message indicating that the request was denied. If the OSW indicates that a communication resource has been allocated, each of the communication units in the limited audience communication transmits an acknowledgement signal to the communication resource allocator after processing the OSW 204.

After a predetermined period of time, typically less than 100 mSec, the communication resource allocator determines whether all of the communication units involved in the limited audience communication have transmitted an acknowledged message 205. If at least one of the communication units has not transmitted an acknowledgement message 205, the communication resource allocator transmits an allocation message, or refresher message, at a periodic rate based on control channel activity to the communication units 206. The periodic transmission rate is varied based on control channel activity. For example, if the control channel is busy, or having a high amount of use, the allocation message will not be transmitted as often as it would be when there is light traffic on the control channel.

Once all the of communication units in the limited audience communication have transmitted an acknowledgement message 205, the communication resource allocator determines whether a communication unit of the limited audience communication has transmitted an activity update message 207. If a communication unit has not transmitted an activity update message 207, the communication resource allocator determines whether the limited audience communication has ended 208. If the limited audience communication has ended this routine is completed for this particular limited audience communication. If, however, the limited audience communication has not ended 208, the communication resource allocator waits either for the limited audience communication to end or a communication unit to transmit an activity update message. While the communication resource allocator waits, it does not transmit the allocation message, thus reducing control channel activity.

If a communication unit of the limited audience communication transmits an activity update message 207, the communication resource allocator transmits the allocation message to the communication unit that requests the activity update 209. A communication unit transmits an activity update message when it is temporarily unable to receive the allocated communication resource or the control channel due to either being out of range, low power, or an obstruction. After transmitting the allocation message, the process repeats at step 204 wherein the communication resource allocator determines whether it has received an acknowledgement message from the communication unit. If the communication resource allocator does not receive an acknowledgement, it will retransmit the allocation message at the periodic rate based on the control channel activity as discussed with respect to step 206.

The above describes a method that will enable the communication resource allocator to reduce control channel activity while supporting a limited audience communication by only transmitting a resource allocation message when requested. With reducing control channel traffic, the communication resource allocator is able to process more control information thus improving the efficiency of the trunking communication system.

I claim:

1. In a trunking communication system that includes a plurality of communication units, a limited number of communication resources that are transceived via a predetermined number of repeaters, and a communication resource allocator that allocates the limited number of communication resources among the plurality of communication units, a method for the communication resource allocator to reduce control channel activity for limited audience communications, the method comprises the steps of:
   a) upon receiving a request, allocating a communication resource to a requesting communication unit, wherein the request includes a requested communication activity;
   b) determining whether the requested communication activity is for a limited audience communication, wherein the limited audience communication is amongst a limited number of communication units;
   c) when the requested communication activity is for the limited audience communication, transmitting a communication resource allocation signal to the limited number of communication units at a periodic interval until an allocation acknowledgment signal is received from each of the limited number of communication units, wherein the communication resource allocation signal indicates the communication resource allocated to the limited number of communication units; and
   d) once the allocation acknowledgment has been received from each of the communication units in the limited number of communication units, ceasing, by the communication resource allocator, transmission of the communication resource allocation signal at the periodic interval such that activity on the control channel is reduced.

2. The method of claim 1 further comprises:

d) receiving an activity update request from a communication unit of the limited number of communication units; and e) transmitting the communication resource allocation signal to the communication unit at the periodic interval until the allocation acknowledgment signal is received from the communication unit.

3. In a trunking communication system that includes a plurality of communication units, a limited number of communication resources that are transceived via a predetermined number of repeaters, and a communication resource allocator that allocates the limited number of communication resources among the plurality of communication resources, a method for communication units of a limited number of communication units that are participating in a limited audience communication to reduce control channel activity, the method comprises the steps of:

a) requesting, by a communication unit of the limited number of communication units, a communication resource for the limited audience communication;

b) receiving, by each of the communication units of the limited number of communication units, a communication resource allocation signal from the communication resource allocator, wherein the communication resource allocation signal indicates the communication resource that is allocated for the limited audience communication; and c) acknowledging, by the each of the communication units of the limited number of communication units, the communication resource allocation signal such that, when all of the communication units in the limited number of communication units have acknowledged the communication resource allocation signal, the communication resource allocator does not transmit the communication resource allocation signal during the limited audience communication.

4. The method of claim 3 further comprises transmitting an activity update request when the communication unit is disconnected from the limited audience communication.

5. The method of claim 4 further comprises acknowledging a response from the communication resource allocator to the activity update request.

* * * * *